Jan. 20, 1953     A. S. RAETTIG     2,625,740
CIRCLE SQUARER
Filed May 8, 1951     2 SHEETS—SHEET 1
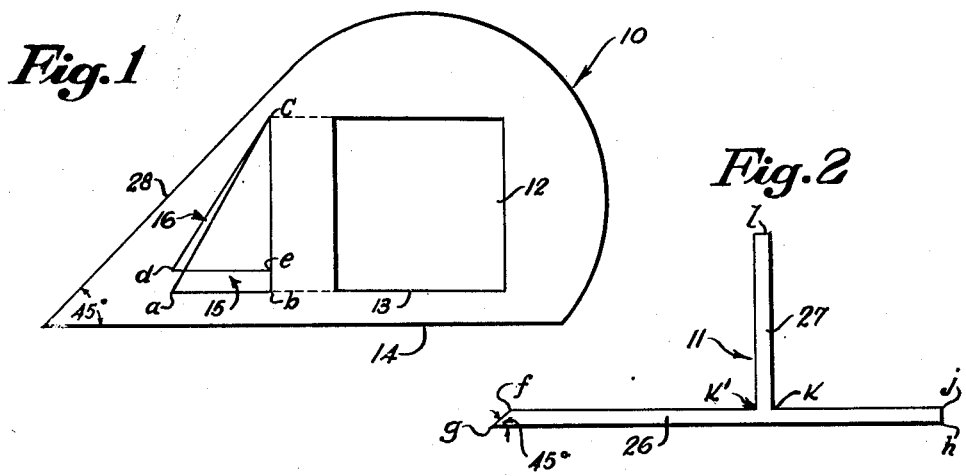
Fig.1    Fig.2
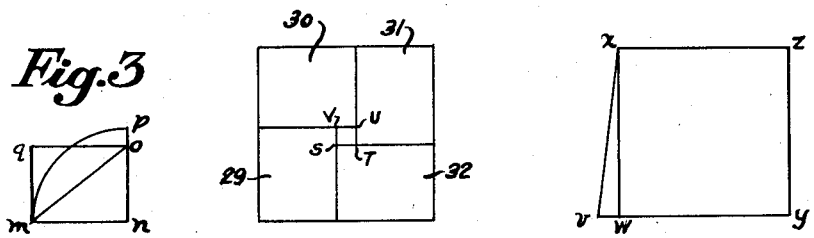
Fig.3    Fig.4    Fig.5
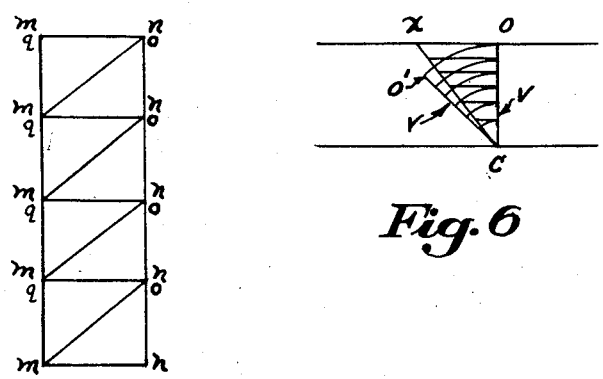 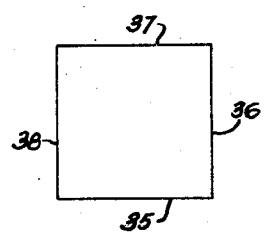
Fig.6    Fig.8
Fig.7
INVENTOR.
ADELE S. RAETTIG
BY
*Richards Grier*
ATTORNEYS

INVENTOR.
ADELE S. RAETTIG

Patented Jan. 20, 1953

2,625,740

UNITED STATES PATENT OFFICE 2,625,740

CIRCLE SQUARER

Adele S. Raettig, Hoboken, N. J.

Application May 8, 1951, Serial No. 225,117

5 Claims. (Cl. 33—1)

This invention relates to a device or circle-squarer for converting the area of a circle into a square of equal area or conversely, and the circumference of a circle into the perimeter of a square of equal length or conversely.

In various engineering problems, it frequently becomes necessary to lay out a square having an area equal to that of a given circle or to lay out a circle having an area equal to that of a given square. Moreover, the rearrangement of the circumference of a given circle into the perimeter of a square of equal length is encountered as well on the converse of the problem. At present, such problems involve mathematical calculations in which the indefinite value of $\pi$ is ever present and finally actual construction which is time consuming and resulting in figures having a degree of accuracy dependent upon the quality and/or condition of the instruments used and the skill of the operator.

It is an object of the instant invention to facilitate the work of mathematicians, engineers, and architects, and of students in said fields.

Other objects of the instant invention will become apparent in the course of the following specification.

In the accomplishment of these objectives, the device is constituted of a transparent body of any convenient size in which a square opening has been formed. Correlated with the square opening and at one side thereof are two right angle triangles inscribed on the transparent body. The base of one of the right angle triangles is on the line of the base of the cut out square extended and the perpendicular thereof is equal to the height of the square. The perpendicular of the second right angle triangle is superposed on that of the first starting at the top and extending downwardly toward the base. The base of the second triangle is of equal length to that of the first so that the hypotenuse of each right angle triangle is of different length and intersects the perpendicular at different angles. The first right angle triangle is utilized in coaction with the cut out square when converting the area of a given circle into a square of equal area or conversely. The second right angle triangle is used in coaction with the cut out square when converting the circumference of a circle into the perimeter of a square of equal length or conversely. An inverted T-shaped guide is provided so that when the center of a given circle has been located on the perpendicular of the first right triangle and the circumference intersects the hypotenuse thereof, the square of equal area is directly formed in the cut out square by the guide. Conversely, by locating a given square in coaction with the guide in the cut out square, the center and radius of a circle of equal area is quickly found on the first triangle. The second triangle is utilized in conjunction with the guide and cut out square to convert the circumference of a circle into the perimeter of a square of equal length and conversely.

The invention will appear more clearly from the following detailed description when taken in connection with the accompanying drawings showing by way of example a preferred embodiment of the inventive idea.

In the drawings:

Figure 1 is a top plan view of the device constructed in accordance with the principles of this invention.

Figure 2 is a top plan view of the guide utilized in conjunction with the device shown in Figure 1.

Figure 3 is a diagrammatic view of a quadrant of a circle converted into a rectangle of equal area.

Figure 4 is a diagrammatic view of four of the rectangles shown in Figure 3 arranged in the order of a square but having a space over at the center.

Figure 5 is a diagrammatic view of a square equal in area to four of the rectangles shown in Figure 3 but without a space over as shown in Figure 4.

Figure 6 is a diagrammatic view of an eighth of a circle with a radius of $mn$, the area of which is made up of layers with progressively decreasing arcs (eighths of circumferences).

Figure 7 is a diagrammatic view of four of the rectangles shown in Figure 3 arranged one above the other and having an area equal to a circle of which Figure 3 is one quadrant and in which the sum of the vertical lines is equal to the circumference.

Figure 8 is a diagrammatic view of a square having a perimeter equal to the sum of the vertical lines of Figure 7 or the perimeter of a square which is equal to the circumference of a circle of which Figure 3 shows one quadrant.

Figure 9:
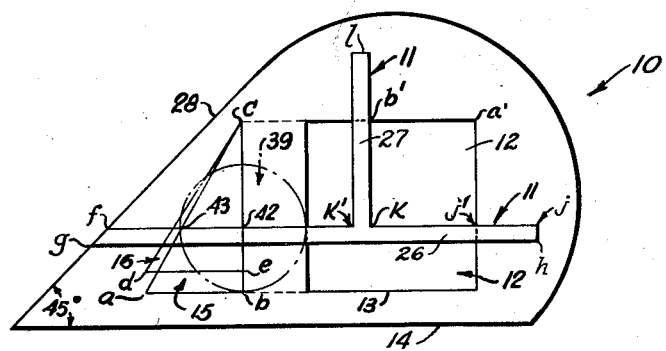
Figure 9 is a plan view of the device and guide showing the method for converting the area of a circle into a square of equal area.

Referring now in greater detail to the drawings where like reference numerals indicate like parts, reference numeral 10 indicates the transparent body of the device or circle-squarer, and 11 the guide coacting with the body.

The device 10 is a flat body of any suitable transparent material having a base 14 and an edge 28 forming an angle of 45° therewith. In the body is a square opening 12 with sides equal to the square wyzx in Figure 5 and in which the base 13 may be parallel to the base 14 of the device 10. At the left of the square opening 12, as viewed in Figure 1, are the right angle triangles 15 and 16, the top of the perpendicular of each of which is along the top edge of the square when projected, the top edge projected being at 90° to the perpendiculars. The base ab of the triangle 15 lies along the line of the base 13 of the square opening 12 extended and is equal in length to the base of the rectangle mnoq (Fig. 3) described later. The perpendicular cb of the triangle 15 is equal in length to one side of the square opening 12. The perpendicular ce of the right angle triangle 16 is superposed on the perpendicular bc, starting at the top (Fig. 1) and extending downwardly toward the base ab of the triangle 15 for a distance equal to twice ox in Figure 6 or twice no in Figure 3 or to one side of the square in Figure 8. The base de of the triangle 16 is equal in length to the base ab of the triangle 15 so that the hypotenuse dc of the triangle 16 is less than the hypotenuse ac of the triangle 15 and the angle dce of the triangle 16 greater than the angle acb of the triangle 15.

Coacting with the inscribed triangles and cut out square of the transparent body 10 is a guide 11 of any suitable material. The guide 11 is in the form of an inverted T with a horizontal member 26 and an upright member 27 and so constructed that the upper edges fk' and kj (Fig. 2) are in a straight line within the limits of construction and the angle lkj a right angle. The left end of the horizontal member 26, that is, the edge gf (Fig. 2), is formed at an angle of 45° with the lower edge gh, so that when the edge gf slides along the edge 28 (Fig. 1) the open square space will always show true squares. The guide may be provided with a hand grip (not shown).

The theory upon which the inscribed right angle triangles 15 and 16 and cut out square 12 are constructed is as follows:

Any quadrant of a circle mnp (Fig. 3) having a radius mn may be converted into a rectangle mnoq of equal area by constructing on the radius mn of the quadrant a diagonal mo to the perpendicular np where the angle nmo is equal to approximately 37° 45' and completing the figure. There are several methods of finding the position of this diagonal. One is to locate the line running through the center of gravity of the quadrant from the m end which can be done by suspension and plumb-line or by equalizing the weight on two flat scales in juxtaposition. Experiment with the latter, placed angle nmo at 37° 45'; subject to correction. Another method is to take a quadrant of proper substance and thickness t, melt it, and recast the melted material in a rectangular mold with open top and base measurement of the product of mn and t. The height of the resulting shape corresponds to no. A line is drawn on the flat side from m to o, for the diagonal, and angle nmo measured.

To convert the rectangle mnoq, representing the area of the circular quadrant mnp into a square having an area equal to that of a circle of which the quadrant mnp is one-fourth, rectangles 29, 30, 31 and 32, identical with the rectangle of Figure 3, are arranged to form a square as shown in Figure 4. However, while the resulting Figure 4 is a square there is a square space stuv over in the center so that the sides of the so arranged square must be reduced to eliminate the residual area over stuv. Since the square on the hypotenuse of any right angle triangle is equal to the sum of the squares on the other two sides, a square (Fig. 5) is constructed on the perpendicular wx of the right angle triangle vwx which has a hypotenuse equal to the side of the square formed by the rectangles and shown in Figure 4 and a base equal to a side st of the central square space over stuv. Thus, a square having sides equal to wx (Fig. 5) will be equivalent in area to the four rectangles arranged as shown in Figure 4 with the central space over eliminated or the square wyzx will have an area equal to a circle of which mnp (Fig. 3) is one quadrant.

By construction, the cut out square 12 (Fig. 1) is made equal to the square wyzx of Figure 5. Also by construction, the base ab of the triangle 15 is made equal to the base mn (Fig. 3) of the rectangle mnoq and as shown a circle with center at b (Fig. 1) and radius ab will form the corresponding cut out square 12. By connecting the points a and c of the triangle 15 a series of radii between the limits of c and ab are found which when converted to an equivalent square by the guide 11 as later shown will give a series of squares the areas of which correspond to the radii of the circles between the aforesaid limits of c and ab.

Figure 6 shows two horizontal lines parallel to each other and separated by distance r (radius=mn (Fig. 3)). To the left of the central vertical is one-eighth of a circle with radius r. The one-eighth or 45° section may be assumed a portion of a flat circular plate from which when held upright, perpendicular to the paper, there is rolled off the 45° arc's length on the upper horizontal line from o, landing at x. Hence, ox is therefore one-eighth of the circumference of a circle of mn or oc radius. The area of the section coo' may be considered as composed of flexible layers, each with its own ⅛ circumference. The outermost is the determining factor of oo'. Inwardly toward the center, the ⅛ circumferences become progressively shorter to disappear at c. By connecting x and c, the triangle cox equal to the area coo' is formed. The triangle cox is a right-angle triangle and since the right-angle triangle mno equals the same area the triangle cox=mno, and ox=no=⅛ of the circumference.

If one of the sides 35, 36, 37 or 38 of the square shown in Figure 8, dimensioned as described above, is laid off on the perpendicular cb as ce (Fig. 1) and the base ed is constructed perpendicular thereto and equal to the radius mn of the arc shown in Figure 3 and the upper edge fk' of the guide 11 is placed along the line de with the edge fg on edge 28, a square will be formed in the cut out square 12 which has a perimeter equal to that of the circumference of a circle of which the arc mp is one quarter. In a similar manner, by drawing the hypotenuse dc the circumference to any circle having a radius between the limits of the radius de (equal to mn in Figure 3) and c may be converted into the perimeter of a square of equal length. Contrariwise, with a circle's perimeter given in length, the circle's radius can be found by working backwards from the square space, taking one-fourth of the given length as the side of a square and finding the radius in triangle 16.

The operation with the device or circle-squarer is as follows:

Suppose it is desired to convert the area of the circle 39 as shown in Figure 9 into a square of equivalent area. The device 10 is placed over the circle 39 until the center 42 thereof lies along the vertical bc of the triangle 15 and the radius fits horizontally in triangle 15. The guide 11 is then placed on the device 10 with the upper edge fk' of the guide passing through the point 42 and the point 43, that is, where the circumference of the circle 39 cuts the hypotenuse ac, i. e., the end of the horizontal radius in the triangle 15 and with the angular end gf of the guide along the edge 28 of the device 10 so that the upper edge kj' will be parallel with the base 13 of the cut out square 12. Then, the square kj'a'b' formed by the guide 11 in the cut out square 12 will have an area equal to the area of the circle 39.

Conversely, suppose it is desired to construct a circle 39 having an area equal to a given square kj'a'b', with the edges j'a' and a'b' over two adjacent sides of the square and the guide 11 over the other two sides as shown in Figure 9, it is only necessary to follow along the edge fk' to find where the same intersects the perpendicular bc which will be the center of the circle and where the same edge intersects the hypotenuse ac which will give the radius of the circle of equivalent area.

Figure 10:
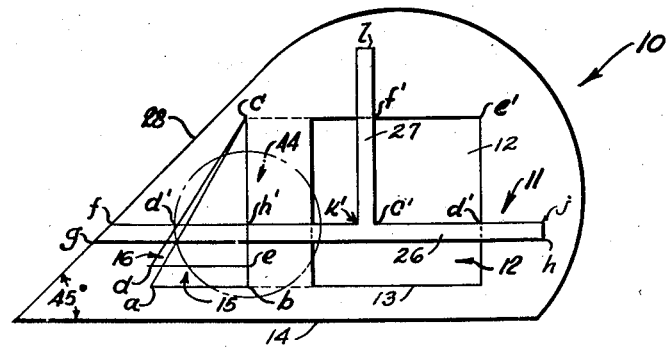
Figure 10 is a plan view of the device and guide showing the method for converting the circumference of a circle into the perimeter of a square of equal length.

Suppose further that it is desired to construct a square having a perimeter equal to that of the circumference of the circle 44 in Figure 10. The device 10 is superposed on the circle 44 until the center falls along the perpendicular ce of the triangle 16 and its radius fits horizontally in the triangle 16. The guide 11 is then placed on the device 10 with the end gf along the edge 28 of the device, and the upper edge through the point h' and the point d'. The square c'd'e'f' formed by the guide 11 in coaction with the cut out square 12 will have a perimeter equal to the circumference of the circle 44. In a similar manner, the perimeter of a given square may be converted into a circular circumference of equal length by placing the device 10 and guide 11 over the perimeter of the square and finding the center and radius of the desired circle along the points where the upper edge fk' intersects the vertical ce and hypotenuse dc of the triangle 16.

It is apparent that the specific illustrations shown above have been given by way of illustration and not by way of limitation and that the structures above described are subject to wide variation and modifications without departing from the scope or intent of the invention, all of which variations and modifications are to be included within the scope of the present invention.

What is claimed is:

1. A device for converting the areas of circles within predetermined limits into squares of equal area or conversely, the device comprising a flat transparent body, the body having a right angle triangle formed thereon, the base of the triangle being equal in length to the radius of the circle of maximum limit and the perpendicular of the triangle being equal in length to the side of a square having an area equal to the area of the circle of maximum limit, the body further having a square opening formed therein, one side of the square opening having the upper end thereof on a line which when projected will intersect the top of the perpendicular of the triangle at 90° and the base of the square opening being aligned with the base of the triangle, means for transferring any point on the perpendicular of the triangle to the square opening along a line parallel to the base of the triangle and intersecting at least one of the sides of the square opening, the transferred point being spaced from the point of intersection a distance equal to the distance from the top of the perpendicular of the triangle to the point thereon being transferred, and means for inscribing a square in the square opening using the transferred point as one corner of the inscribed square and one of the corners of the square opening along the upper edge thereof as the opposite corner of the inscribed square.

2. A device for converting the areas of circles within predetermined limits into squares of equal area or conversely in combination with a guide, the device comprising a flat transparent body, the body having at least one straight angle edge and a second straight angle edge inclined to the first at an angle of 45°; the transparent body further having a right angle triangle formed thereon, the base of the triangle being parallel to the first straight angle edge and spaced from the second and equal in length to the radius of the circle of maximum limit, the perpendicular of the triangle being at the end of the base most remote from the second straight angle edge and equal in length to the side of a square having an area equal to the area of the circle of maximum limit; the body further having a square opening formed therein, the opening being spaced from the triangle on the side of the perpendicular thereof and with the base of the square aligned with the base of the triangle and equal in length to the perpendicular of the triangle; the device further comprising a guide for the transparent body, the guide comprising an inverted T-shaped member, the inverted T-shaped member comprising an upright straight edge portion and a horizontal straight edge portion disposed intermediate the ends thereof at the base of the upright portion, the center lines of the portions forming an angle of 90° with each other, one end of the horizontal portion being inclined at 45° to the center line thereof and coinciding with the inclined edge of the transparent body when the edge of the horizontal portion most remote from the first edge of the body is superposed on the bases of the triangle and the square and the edge of the upright portion most remote from the triangle is superposed on the upright edge of the square adjacent the triangle.

3. A device for converting the circumferences of circles within predetermined limits into the perimeters of squares of equal length or conversely, the device comprising a flat transparent body, the body having a right angle triangle formed thereon, the base of the triangle being equal in length to the radius of the circle of maximum limit, the perpendicular of the right triangle being equal in length to twice the length of one side of a rectangle equal in area to the area of a quadrant of the circle of maximum limit where the other side of the rectangle is equal to the radius of the circle of maximum limit, the transparent body further having a square opening formed therein, the upper edge of the square opening being on a line which when projected will intersect the top of the perpendicular of the triangle at 90° and the sides of the square opening extending downwardly at least to the bottom of and in spaced parallel arrangement with the perpendicular of the triangle, means for transferring any point on the perpendicular of the triangle to the square opening along a line at 90° to said perpendicular at said point and intersecting at least one of the sides of the square opening, the transferred point being spaced from the point of intersection a distance equal to the distance from the top of the perpendicular of the triangle to the point thereon being transferred, and means for inscribing a square in the square opening using the transferred point as one corner of the inscribed square and one of the corners of the square opening along the upper edge thereof as the opposite corner of the inscribed square.

4. A device for converting the circumferences of circles within predetermined limits into the perimeters of squares of equal length or conversely in combination with a guide, the device comprising a flat transparent body, the body having at least one straight angle edge and a second straight angle edge inclined to the first at an angle of 45°; the transparent body further having a right angle triangle formed thereon, the base of the triangle being parallel to the first straight angle edge and spaced from the second and equal in length to the radius of the circle of maximum limit, the perpendicular of the triangle being equal in length to twice a principal dimension of a rectangle equal in area to the area of a quadrant of the circle of maximum limit where the other principal dimension of the rectangle is equal to the radius of the circle of maximum limit; the transparent body further having a square opening formed therein, the opening being spaced from the right triangle on the side of the perpendicular thereof with the upper side of the square aligned with the upper apex of the triangle and perpendicular in direction to the perpendicular of the triangle; the device further comprising an inverted T-shaped guide slidable over the face of the transparent body, the guide comprising an upright straight edge portion and a horizontal straight edge portion disposed intermediate the ends thereof at the base of the upright portion, the center lines of the portions forming an angle of 90° with each other, one end of the horizontal portion being inclined at 45° to the center line thereof and coinciding with the inclined edge of the transparent body when the edge of the horizontal portion most remote from the first straight angle edge of the body is superposed on the base of the triangle and the edge of the upright portion most remote from the triangle is a distance equal to the length of said perpendicular from the side of the square remote from the triangle.

5. A device for converting the areas of circles within predetermined limits into squares of equal area and the circumferences of the circles into the perimeters of squares of equal length or conversely in combination with a guide; the device comprising a flat transparent body having two straight angle edges inclined at 45° to each other; the body further having a right angle triangle formed thereon, the base of the triangle being parallel to one of the straight angle edges and spaced from the other and equal in length to the radius of the circle of maximum limit, the perpendicular of the triangle being at the end of the base most remote from the inclined edge of the body and equal in length to the side of a square having an area equal to the area of the circle of maximum limit; the body further having a square opening formed therein, the opening being spaced from the triangle on the side of the perpendicular thereof with the base of the square aligned with the base of the triangle and equal in length to the perpendicular of the triangle; the body further having a second right angle triangle formed thereon, the perpendicular of the second triangle being superposed on the perpendicular of the first and extending downwardly from the top of the perpendicular of the first triangle toward the base thereof, the perpendicular of the second triangle being equal in length to twice a principal dimension of a rectangle equal in area to the area of a quadrant of the circle of maximum limit where the other principal dimension of the rectangle is equal to the radius of the circle of maximum limit, the base of the second triangle being spaced from and parallel to the base of the first and equal to the radius of the circle of maximum limit; the device comprising an inverted T-shaped guide for the transparent body, the guide comprising an upright straight edge portion and a horizontal straight edge portion disposed intermediate the ends thereof at the bottom of the upright portion and with the center lines of the portions at 90° to each other, one end of the horizontal portion being angular and parallel with the inclined edge of the body when the edges of the horizontal portion of the guide are parallel to the bases of the triangles and the base of the square and the edges of the upright portion are parallel to the perpendiculars of the triangles.

ADELE S. RAETTIG.

REFERENCES CITED

The following references are of record in the file of this patent:

UNITED STATES PATENTS

| Number | Name | Date |
|---|---|---|
| 808,511 | Cochran | Dec. 26, 1905 |
| 870,959 | Hitchings | Nov. 12, 1907 |
| 1,163,392 | Cashmore | Dec. 7, 1915 |
| 1,409,723 | Jacob | Mar. 14, 1922 |